US009179417B2

(12) United States Patent
Wang (10) Patent No.: US 9,179,417 B2
(45) Date of Patent: Nov. 3, 2015

(54) METHOD, APPARATUS, AND TERMINAL FOR WIRELESS NETWORK CONNECTION

(71) Applicant: Huawei Device Co., Ltd., Shenzhen (CN)

(72) Inventor: Yanling Wang, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 311 days.

(21) Appl. No.: 13/730,481

(22) Filed: Dec. 28, 2012

(65) Prior Publication Data

US 2013/0116001 A1    May 9, 2013

Related U.S. Application Data

(63) Continuation of application No. PCT/CN2011/078892, filed on Aug. 25, 2011.

(30) Foreign Application Priority Data

Aug. 25, 2010    (CN) .......................... 2010 1 0263087

(51) Int. Cl.
*H04W 52/22* (2009.01)
*H04W 52/36* (2009.01)
*H04W 72/04* (2009.01)

(52) U.S. Cl.
CPC .......... *H04W 52/228* (2013.01); *H04W 52/367* (2013.01); *H04W 72/0473* (2013.01); *Y02B 60/50* (2013.01)

(58) Field of Classification Search
CPC ............ H04W 52/228; H04W 52/225; H04W 52/226; H04W 52/367; H04W 52/34; H04W 52/32; H04W 52/322; H04W 52/325; H04W 52/327; H04W 72/0473; Y02B 60/50
USPC ......... 455/69, 522, 450, 41.2, 63.1, 513, 516, 455/553.1, 509, 423, 452.2; 370/328, 242, 370/338, 252, 311, 278; 375/225, 227
See application file for complete search history.

(56) References Cited

U.S. PATENT DOCUMENTS 5,345,596 A * 9/1994 Buchenhorner et al. ...... 455/450
6,674,739 B1 * 1/2004 Lee et al. ...................... 370/342
(Continued)

FOREIGN PATENT DOCUMENTS

| CN | 1449636 A | 10/2003 |
|----|-----------|---------|
| CN | 1210885 C | 7/2005 |

(Continued)

OTHER PUBLICATIONS

Written Opinion of International Searching Authority issued in corresponding PCT Patent Application No. PCT/CN2011/078892, mailed Dec. 1, 2011.

(Continued)

*Primary Examiner* — Tan H Trinh
(74) *Attorney, Agent, or Firm* — Brinks Gilson & Lione (57) ABSTRACT

The present invention relate to a method, an apparatus, and a terminal for wireless network connection. The method includes: acquiring lowest transmit power of a communication terminal that establishes connection with a wireless network access point, where the lowest transmit power is minimum transmit power that can ensure connection and communication between the communication terminal and the wireless network access point; and adjusting and determining transmit power of the communication terminal according to the lowest transmit power. With the implementation of the embodiments of the present invention, the communication terminal automatically reduces transmit power without affecting normal network connection, so that manual setting by users is avoided, electrical energy is saved, radiation is reduced, and convenient network access by users is ensured.

8 Claims, 6 Drawing Sheets

(56) References Cited

U.S. PATENT DOCUMENTS

| | | |
|---|---|---|
| 6,735,447 B1 | 5/2004 | Mueller |
| 6,748,246 B1 | 6/2004 | Khullar |
| 6,899,681 B1 * | 5/2005 | Phillips et al. ...... G01S 7/52026 600/437 |
| 7,587,217 B1 * | 9/2009 | Laakso et al. ............. 455/522 |
| 7,672,282 B1 * | 3/2010 | Chhabra ................... 370/338 |
| 7,760,681 B1 * | 7/2010 | Chhabra ................... 370/328 |
| 2002/0094834 A1 * | 7/2002 | Baker et al. ............... 455/522 |
| 2003/0130002 A1 * | 7/2003 | Chen et al. ................ 455/522 |
| 2003/0195017 A1 * | 10/2003 | Chen et al. ............... 455/562.1 |
| 2005/0078651 A1 * | 4/2005 | Lee et al. .................. 370/349 |
| 2006/0093026 A1 * | 5/2006 | Montojo et al. ........... 375/225 |
| 2007/0140191 A1 * | 6/2007 | Kojima ..................... 370/338 |
| 2007/0197254 A1 | 8/2007 | Borran et al. |
| 2007/0223403 A1 * | 9/2007 | Furuskar et al. .......... 370/278 |
| 2008/0159196 A1 * | 7/2008 | Roh et al. ................. 370/311 |
| 2009/0042593 A1 * | 2/2009 | Yavuz et al. .............. 455/522 |
| 2009/0137241 A1 * | 5/2009 | Yavuz et al. .............. 455/423 |
| 2009/0252051 A1 * | 10/2009 | Yu et al. ................... 370/252 |
| 2010/0002616 A1 | 1/2010 | Peng et al. |
| 2013/0111235 A1 * | 5/2013 | Yang et al. ................ 713/310 |

FOREIGN PATENT DOCUMENTS

| | | |
|---|---|---|
| CN | 1753328 A | 3/2006 |
| CN | 101237260 A | 8/2008 |
| CN | 101366196 A | 2/2009 |
| CN | 101951671 A | 1/2011 |

OTHER PUBLICATIONS

Extended European Search Report issued in corresponding European Patent Application No. 11819428.1, mailed May 28, 2013.

Office Action issued in corresponding Chinese Patent Application No. 201010263087.3, May 18, 2012.

International Search Report issued in corresponding PCT Patent Application No. PCT/CN2011/078892, mailed Dec. 1, 2011.

* cited by examiner

FIG. 1

| Data Rate (Mbps) | Receiver Threshold Level (dBm) |
|---|---|
| 6 | -82 |
| 9 | -81 |
| 12 | -79 |
| 18 | -77 |
| 24 | -74 |
| 36 | -70 |
| 48 | -66 |
| 54 | -65 |

METHOD, APPARATUS, AND TERMINAL FOR WIRELESS NETWORK CONNECTION

CROSS-REFERENCE TO RELATED APPLICATIONS

This application is a continuation of International Application No. PCT/CN2011/078892, filed on Aug. 25, 2011, which claims priority to Chinese Patent Application No. 201010263087.3, filed on Aug. 25, 2010, both of which are hereby incorporated by reference in their entireties.

FIELD OF THE INVENTION

The present invention relates to the field of communication technologies, and in particular to a method, an apparatus, and a terminal for wireless network connection.

BACKGROUND OF THE INVENTION

As scientific technologies grow, wireless network technologies embrace unprecedented boost. In actual applications, however, conventional wireless network technologies encounter certain problems. The representative WiFi (Wireless Fidelity) technology among wireless network technologies is taken as an example in the following to describe the problem solved by the present invention.

At present, WiFi technology is widely used in various communication terminals including smart phones. WiFi technology includes IEEE802.11b/g/n wireless network specifications, and is a short-range wireless network technology that can interconnect communication terminals, such as a personal computer and a portable device (for example, PDA and mobile phone). Generally, the rated transmit power of most existing WiFi communication terminals using WiFi modules (WiFi STAs for short) is initially set to 100 mW (that is, 20 dBm) to cover WiFi network access points (WiFi APs for short) within a range of 100 M. This rated power generally cannot be changed after initial setting. Only a minority of WiFi communication terminals provide users with the function of manually setting the rated power.

Figure 1:
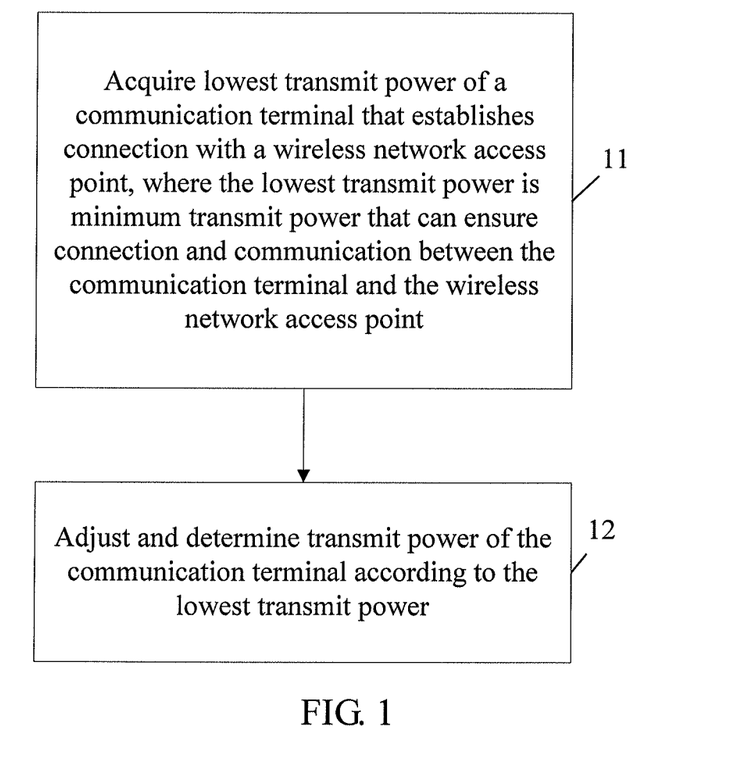
FIG. 1 is a first processing flowchart of a method for wireless network connection provided in an embodiment of the present invention.

The inventor finds at least the following problems in the prior art:

First, as shown in FIG. 1, in the prior art, because the rated transmit power of the WiFi STA is generally initially set to 100 mW, and the rated power generally cannot be changed after initial setting, the 100 mW transmit power is used regardless of the distance between the WiFi STA and a WiFi AP, resulting in huge power consumption and huge radiation to human body.

Second, in the prior art, although a minority of WiFi communication terminals provide users with the function of manually setting the rated power, operations of the function are complicated and certain professional knowledge is required in actual applications, and manual setting is a waste of time and great effort for users.

SUMMARY OF THE INVENTION

Embodiments of the present invention provide a method, an apparatus, and a terminal for wireless network connection, so that a communication terminal can automatically reduce transmit power, the trouble of manual setting by users is avoided, electrical energy is saved, radiation is reduced, and convenient and secure network access for users is ensured.

An embodiment provides a method for wireless network connection, including:

acquiring lowest transmit power of a communication terminal that establishes connection with a wireless network access point, where the lowest transmit power is minimum transmit power that can ensure connection and communication between the communication terminal and the wireless network access point; and adjusting and determining transmit power of the communication terminal according to the lowest transmit power.

An embodiment provides an apparatus for wireless network connection, including:

a lowest transmit power acquiring unit, configured to acquire lowest transmit power of a communication terminal that establishes connection with a wireless network access point, where the lowest transmit power is minimum transmit power that can ensure connection and communication between the communication terminal and the wireless network access point; and a transmit power adjusting unit, configured to adjust and determine transmit power of the communication terminal according to the lowest transmit power.

An embodiment provides a communication terminal, including the apparatus for wireless network connection.

It can be seen from the technical solutions provided by the present invention that, with the technical solutions provided in embodiments of the present invention, transmit power of a communication terminal can be automatically adjusted, so that the communication terminal can perform normal wireless access with the lowest transmit power, electrical energy consumed by the communication terminal is saved, the radiation generated by the communication terminal is reduced, and meanwhile the problem in the prior art that manual setting of the transmit power of the communication terminal by users is a waste of time and great effort but provides poor accuracy is effectively solved.

BRIEF DESCRIPTION OF THE DRAWINGS

To clearly illustrate technical solutions in the embodiments of the present invention or in the prior art, the accompanying drawings required for describing embodiments or the prior art are described briefly in the following. Obviously, the accompanying drawings described in the following are merely about some embodiments of the present invention. Those skilled in the art can obtain other drawings based on these drawings without innovative work.

DETAILED DESCRIPTION OF THE EMBODIMENTS

The technical solutions in the embodiments of the present invention are clearly and completely described below with reference to the accompanying drawings in the embodiments of the present invention. Evidently, the embodiments described below are only some, rather than all embodiments of the present invention. Those skilled in the art can derive All other embodiments derived by those skilled in the art based on the embodiments of the present invention without making any creative effort should fall within the protection scope of the present invention.

The embodiments of the present invention are further described with reference to the accompanying drawings.

In this embodiment, the case in which a communication terminal is a mobile phone and a wireless network is a WiFi technology wireless network is taken as an example for description. It should be noted that the communication terminal described in the embodiment of the present invention is not confined to a mobile phone. Meanwhile, the wireless network described in the embodiment of the present invention is not confined to a WiFi technology wireless network. This embodiment does not constitute restriction on the present invention.

Figure 2:
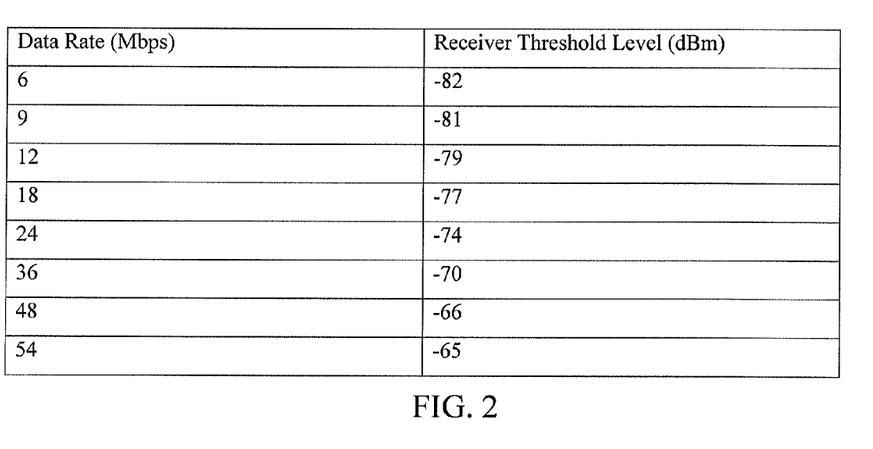
FIG. 2 is a schematic diagram of a data transmission service type standard provided in an embodiment of the present invention.

As shown in FIG. 1 and FIG. 2, the specific implementation process of the method for wireless network connection provided in this embodiment can include the following steps:

Step 11: Acquire lowest transmit power of a communication terminal that establishes connection with a wireless network access point, where the corresponding lowest transmit power is minimum transmit power that can ensure connection and communication between the communication terminal and the wireless network access point.

For example, the acquiring the lowest transmit power of the communication terminal that establishes the connection with the wireless network access point can include:

(1) After establishing the connection with the wireless network access point, acquiring actual received signal strength, a wireless network service type, and a modulation manner of the communication terminal, determining a threshold value of received signal strength of the communication terminal according to the wireless network service type and modulation manner, and determining the lowest transmit power of the communication terminal according to the current transmit power of the communication terminal, the actual received signal strength of the communication terminal, and the threshold value of the received signal strength of the communication terminal.

Specifically, the following takes a WiFi technology wireless network as an example to describe the principle of determining the lowest transmit power of the communication terminal according to the current transmit power of the communication terminal, the actual received signal strength of the communication terminal, and the threshold value of the received signal strength of the communication terminal:

For clear and intuitive description, in the following description, transmit power of a WiFi network access point (that is, WiFi AP) is expressed as P_AP;

received signal strength of a WiFi network access point (that is, WiFi AP) is expressed as RSSI_AP;

transmit power of a WiFi communication terminal (that is, WiFi STA) is expressed as P_STA;

received signal strength of a WiFi communication terminal (that is, WiFi STA) is expressed as RSSI_STA.

The receiving and transmitting channels of air interfaces between the WiFi AP and the WiFi STA are reciprocal. Therefore, air interface path transmission loss in a transmission process is the same. If PATH_LOSS is used to express an air interface path transmission loss value, then:

$$P\_STA=RSSI\_AP+PATH\_LOSS;$$

$$P\_AP=RSSI\_STA+PATH\_LOSS;$$

It can be drawn that, P_AP−P_STA=RSSI_STA−RSSI_AP;

In addition, because generally the difference between P_AP and P_STA is a constant (for example, it can be a constant smaller than 3 dB), if C is used to express this constant, then P_AP−P_STA=RSSI_STA−RSSI_AP=C;

By combining the preceding equation, the following can be drawn: P_STA=RSSI_STA−C+PATH_LOSS;

After further sorting, it can be drawn that: P_STA−RSSI_STA=PATH_LOSS−C; if C1 is used to express the constant PATH_LOSS−C, then P_STA−RSSI_STA=C1; that is, the difference between the transmit power of the communication terminal and the received signal strength of the communication terminal is a constant. If this constant is obtained according to the current transmit power of the communication terminal and the threshold value of the received signal strength of the communication terminal, and the lowest transmit power of the communication terminal can be obtained by adding the constant to the actual received signal strength of the communication terminal. Embodiment 1: The rated transmit power of a certain mobile phone that is configured with the method in this embodiment of the present invention is initially set to 17 dBm. It is assumed that this mobile phone establishes connection with a wireless network access point by using the 17 dBm transmit power, the actual received signal strength of the communication terminal acquired by the mobile phone is −62 dBm, the wireless network service type and modulation manner that are acquired by the mobile phone include a data rate of 6 Mbps and an OFDM (Orthogonal Frequency Division Multiplexing, orthogonal frequency division multiplexing; a multicarrier modulation manner) manner in a 2.4 GHz frequency band. According to the preset data transmission service type standard (as shown in FIG. 2) in the mobile phone, it can be determined that the threshold value of the received signal strength of the mobile phone is −82 dBm. Then, according to the current transmit power (that is, 17 dBm) of the mobile phone and the threshold value (that is, −82 dBm) of the received signal strength of the mobile phone, the corresponding constant (that is, 17−82=−65) can be obtained. Then, the lowest transmit power (that is, 62−65=−3 dBm) of the mobile phone can be obtained by adding the constant (that is, −65) to the actual received signal strength (that is, −62 dBm) of the mobile phone.

(2) Alternatively, after establishing the connection with the wireless network access point, acquiring a wireless network service type and a modulation manner, determining a threshold value of received signal strength of the wireless network access point according to the wireless network service type and the modulation manner, and determining the lowest transmit power of the communication terminal according to the current transmit power of the communication terminal, an air interface path transmission loss value, and the threshold value of the received signal strength of the wireless network access point;

Specifically, the following takes a WiFi technology wireless network as an example to describe the principle of determining the lowest transmit power of the communication terminal according to the current transmit power of the communication terminal, the air interface path transmission loss value, and the threshold value of the received signal strength of the wireless network access point:

For clear and intuitive description, in the following description, transmit power of a WiFi network access point (that is, WiFi AP) is expressed as P_AP;

received signal strength of a WiFi network access point (that is, WiFi AP) is expressed as RSSI_AP;

transmit power of a WiFi communication terminal (that is, WiFi STA) is expressed as P_STA;

received signal strength of a WiFi communication terminal (that is, WiFi STA) is expressed as RSSI_STA.

The receiving and transmitting channels of air interfaces between the WiFi AP and the WiFi STA are reciprocal. Therefore, air interface path transmission loss in a transmission process is the same. If PATH_LOSS is used to express an air interface path transmission loss value, then:

$$P\_STA = RSSI\_AP + PATH\_LOSS;$$

Two equations in a current status and lowest power consumption can be drawn:

$$P\_STA \text{ (current)} = RSSI\_AP \text{ (current)} + PATH\_LOSS \quad (1);$$

$$P\_STA \text{ (lowest transmit power of the communication terminal)} = RSSI\_AP \text{ (threshold value of received signal strength of the wireless network access point)} + PATH\_LOSS \quad (2);$$

The air interface path transmission loss value in the same communication environment is certain. Therefore:

P_STA (current)−P_STA (lowest transmit power of the communication terminal)=RSSI_AP (current)−RSSI_AP (threshold value of the received signal strength of the wireless network access point); that is to say, when the current received signal strength of the wireless network access point is adjusted to be the threshold value of the received signal strength of the wireless network access point, the current transmit power of the communication terminal is also adjusted to be the lowest transmit power of the communication terminal; further, to obtain the lowest transmit power of the communication terminal, the difference between the current received signal strength of the wireless network access point and the threshold value of the received signal strength of the wireless network access point needs to be obtained, and then the difference is subtracted from the current transmit power of the communication terminal. Embodiment 2: The rated transmit power of a certain mobile phone that is configured with the method in this embodiment is initially set to 100 mW (20 dBm). It is assumed that after this mobile phone establishes connection with a wireless network access point by using the 20 dBm transmit power, an acquired wireless network service type and modulation manner include a data rate of 48 Mbps and a DSSS-OFDM (Direct Sequence Spread Spectrum, direct sequence spread spectrum; a spread spectrum communication technology) manner in a 2.4 GHz frequency band. Then, according to the preset data transmission service type standard (as shown in FIG. 2) in the mobile phone, it can be determined that the threshold value of the received signal strength of the wireless network access point is −66 dBm. Then, according to the current transmit power (that is, 20 dBm) of the mobile phone and the air interface path transmission loss value (for example, it can be −76 dBm) of the mobile phone, the current received signal strength (that is, −56 dBm) of the wireless network access point can be determined. Then, according to the current received signal strength (that is, −56 dBm) of the wireless network access point and the threshold value (that is, −66 dBm) of the received signal strength of the wireless network access point, the difference (that is, 10 dBm) between the two can be obtained. Then, the lowest transmit power (that is, 10 dBm) of the mobile phone can be obtained by subtracting the difference (that is, 10 dBm) from the current transmit power (that is, 20 dBm) of the mobile phone.

Further, the manner for acquiring the air interface path transmission loss value can include:

(1) acquiring the air interface path transmission loss value through a real-time measurement manner.

Further, the lowest transmit power of the communication terminal can be obtained by acquiring the air interface path transmission loss value through the real-time measurement manner; for example, according to the air interface path transmission loss value (for example, it may be −76 dBm) acquired through the real-time measurement manner, and the current transmit power (that is, 20 dBm) of the mobile phone, the current received signal strength (that is, −56 dBm) of the wireless network access point can be determined. Then, a difference (that is, 10 dBm) is obtained by subtracting the threshold value (that is, −66 dBm) of the received signal strength of the wireless network access point from the current received signal strength (that is, −56 dBm) of the wireless network access point. Then, the lowest transmit power (that is, 10 dBm) of the communication terminal can be obtained by subtracting the difference (that is, 10 dBm) from the current transmit power (that is, 20 dBm) of the mobile phone.

(2) alternatively, acquiring a preset air interface path transmission loss value;

Further, according to the preset air interface path transmission loss value acquired, the lowest transmit power of the communication terminal can be obtained; for example, according to the acquired preset air interface path transmission loss value (for example, it may be −76 dBm) of the mobile phone and the current transmit power (that is, 20 dBm) of the mobile phone, the current received signal strength (that is, −56 dBm) of the wireless network access point can be determined. Then, a difference (that is, 10 dBm) is obtained by subtracting the threshold value (that is, −66 dBm) of the received signal strength of the wireless network access point from the current received signal strength (that is, −56 dBm) of the wireless network access point. Then, the lowest transmit power (that is, 10 dBm) of the communication terminal can be obtained by subtracting the difference (that is, 10 dBm) from the current transmit power (that is, −20 dBm) of the mobile phone.

(3) alternatively, acquiring communication environment information between the wireless network access point and the communication terminal, and determining the corresponding air interface path transmission loss value according to the communication environment information and preset air interface path transmission loss information corresponding to different communication environment information; where the corresponding communication environment information may include information of the distance between the wireless network access point and the communication terminal, and relevant information that affects air interface path transmission loss, for example, whether an obstacle exists between the wireless network access point and the communication terminal;

Further, according to the determined air interface path transmission loss value, the lowest transmit power of the communication terminal can be obtained; for example, according to the corresponding air interface path transmission loss value (for example, it may be −76 dBm) determined according to the acquired information of the distance (for example, the distance may be 20 m) between the wireless network access point and the communication terminal and the preset air interface path transmission loss information that is corresponding to the different communication environment information (that is, the distance is 20 m), and the current transmit power (that is, 20 dBm) of the mobile phone, the current received signal strength (that is, −56 dBm) of the wireless network access point can be determined. Then, a difference (that is, 10 dBm) is obtained by subtracting the threshold value (that is, −66 dBm) of the received signal strength of the wireless network access point from the current received signal strength (that is, −56 dBm) of the wireless network access point. Then, the lowest transmit power (that is, 10 dBm) of the communication terminal can be obtained by subtracting the difference (that is, 10 dBm) from the current transmit power (that is, 20 dBm) of the mobile phone.

Step 12: Adjust and determine the transmit power of the communication terminal according to the lowest transmit power, to reduce the transmit power of the communication terminal and ensure that the communication terminal can normally perform a communication service.

For example, the process of adjusting and determining the transmit power of the communication terminal according to the lowest transmit power can correspondingly include:

determining whether the lowest transmit power acquired in step 11 is lower than the current transmit power of the communication terminal; if yes, reducing the transmit power of the communication terminal according to a preset step length until the transmit power of the communication terminal is equal to the lowest transmit power, or quality of a current data transmission service meets a preset requirement; if not, not adjusting the transmit power of the communication terminal;

Specifically, when the lowest transmit power acquired in step 11 is lower than the current transmit power of the communication terminal, any one of the following two solutions can be used for processing:

(1) Reduce the transmit power of the communication terminal according to the preset step length, and detect the quality of the data transmission service; if the detected quality of the data transmission service is lower than a preset security value that is for ensuring normal running of the data transmission service, stop reducing the transmit power of the communication terminal, and adjust the transmit power to a critical value that is before the quality of the data transmission service is degraded; if the detected quality of the data transmission service is not lower than a preset security value that is for ensuring normal running of the data transmission service, determine whether the transmit power of the communication terminal is equal to the lowest transmit power acquired in step 11. If yes, stop reducing the transmit power of the communication terminal to complete adjustment of the transmit power of the communication terminal; otherwise, continue to reduce the transmit power of the communication terminal according to the preset step length until the quality of the data transmission service is lower than the preset security value that is for ensuring normal running of the data transmission service or the transmit power of the communication terminal is equal to the lowest transmit power acquired in step 11. The corresponding criteria for determining the quality of the data transmission service may be a service quality indicator PER (Packet Error Rate, packet error rate). Corresponding to Embodiment 1: According to the lowest transmit power (that is, −3 dBm) acquired in step 11, it can be determined that it is lower than the current transmit power (that is, 17 dBm) of the mobile phone. Then, the transmit power of the mobile phone is reduced according to a preset step length (for example, it may be 0.5 dB), and the quality of the data transmission service is detected. Until the transmit power of the mobile phone is reduced to be −2.5 dBm and the detected quality of the data transmission service is lower than a preset security value that is for ensuring normal running of the data transmission service, the reducing the transmit power of the mobile phone is stopped and the transmit power is adjusted to a critical value (that is, −2 dBm) that is before the quality of the data transmission service is degraded, to complete adjustment of the transmit power of the mobile phone. Corresponding to Embodiment 2: According to the lowest transmit power (that is, 10 dBm) acquired in step 11, it can be determined that it is lower than the current transmit power (that is, 20 dBm) of the mobile phone. Then, the transmit power of the mobile phone is reduced according to a preset step length (for example, it may be 0.5 dB), and the quality of the data transmission service is detected. Until the transmit power of the mobile phone is reduced to be equal to the lowest transmit power (that is, 10 dBm) acquired in step 11, it is not found that the detected quality of the data transmission service is lower than a preset security value that is for ensuring normal running of the data transmission service. In this case, the transmit power at this time is used as a critical value that is before the quality of the data transmission service is degraded, and the reducing the transmit power of the mobile phone is stopped, to complete adjustment of the transmit power of the mobile phone.

(2) Alternatively, acquire and save the quality of the current data transmission service, reduce the transmit power of the communication terminal according to a preset step length, and then detect the quality of the data transmission service again; compare the quality of the data transmission service that is detected again with the quality of the data transmission service that is saved previously; if the quality of the data transmission service is degraded to a certain extent, stop reducing the transmit power of the communication terminal, and adjust the transmit power to a critical value that is before the quality of the data transmission service is degraded; if the quality of the data transmission service is not degraded, determine whether the transmit power of the communication terminal is equal to the lowest transmit power acquired in step 11. If yes, stop reducing the transmit power of the communication terminal, to complete adjustment of the transmit power of the communication terminal; otherwise, continue to reduce the transmit power of the communication terminal according to the preset step length until the quality of the data transmission service reaches the critical value that is before the quality of the data transmission service is degraded or the transmit power of the communication terminal is equal to the lowest transmit power acquired in step 11. The corresponding criteria for determining the quality of the data transmission service may be a service quality indicator PER (Packet Error Rate, packet error rate). Corresponding to Embodiment 1: According to the lowest transmit power (that is, −3 dBm) acquired in step 11, it can be determined that it is lower than the current transmit power (that is, 17 dBm) of the mobile phone. Then, the quality of the current data transmission service is first acquired and saved, the transmit power of the mobile phone is reduced according to a preset step length (for example, it may be 0.5 dB), and the quality of the data transmission service is detected again. Until the transmit power of the mobile phone is reduced to be −2.5 dBm and it is found that the quality of the data transmission service detected again is lower than the previously saved quality of the data transmission service, that is, the quality of the data transmission service is degraded to a certain extent, the reducing the transmit power of the mobile phone is stopped and the transmit power is adjusted to a critical value (that is, −2 dBm) that is before the quality of the data transmission service is degraded, to complete adjustment of the transmit power of the mobile phone. Corresponding to Embodiment 2: According to the lowest transmit power (that is, 10 dBm) acquired in step 11, it can be determined that it is lower than the current transmit power (that is, 20 dBm) of the mobile phone. Then, the quality of the current data transmission service is acquired and saved first, the transmit power of the mobile phone is reduced according to a preset step length (for example, it may be 0.5 dB), and the quality of the data transmission service is detected again. Until the transmit power of the mobile phone is reduced to be equal to the lowest transmit power (that is, 10 dBm) acquired in step 11, the quality of the data transmission service detected again is not found lower than the previously saved quality of the data transmission service. In this case, the transmit power at this time is used as a critical value that is before the quality of the data transmission service is degraded, and the reducing the transmit power of the mobile phone is stopped, to complete adjustment of the transmit power of the mobile phone.

To make the purpose, technical solutions, and advantages of the present invention much clearer, the following further describes the embodiments of the present invention in detail with reference to the embodiments and corresponding accompanying drawings.

Figure 3A:
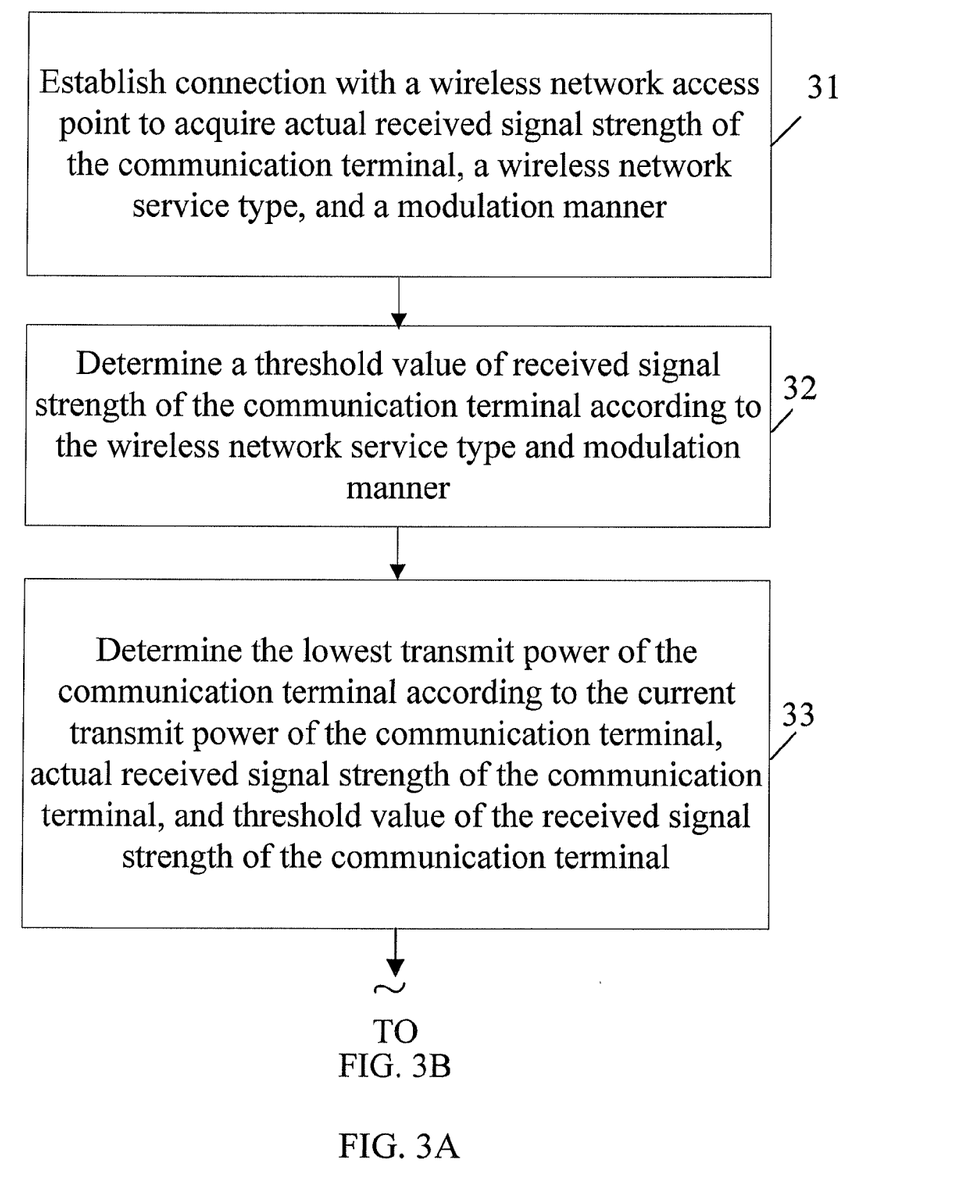
FIG. 3A and FIG. 3B are a second processing flowchart of a method for wireless network connection provided in an embodiment of the present invention.
Figure 3B:
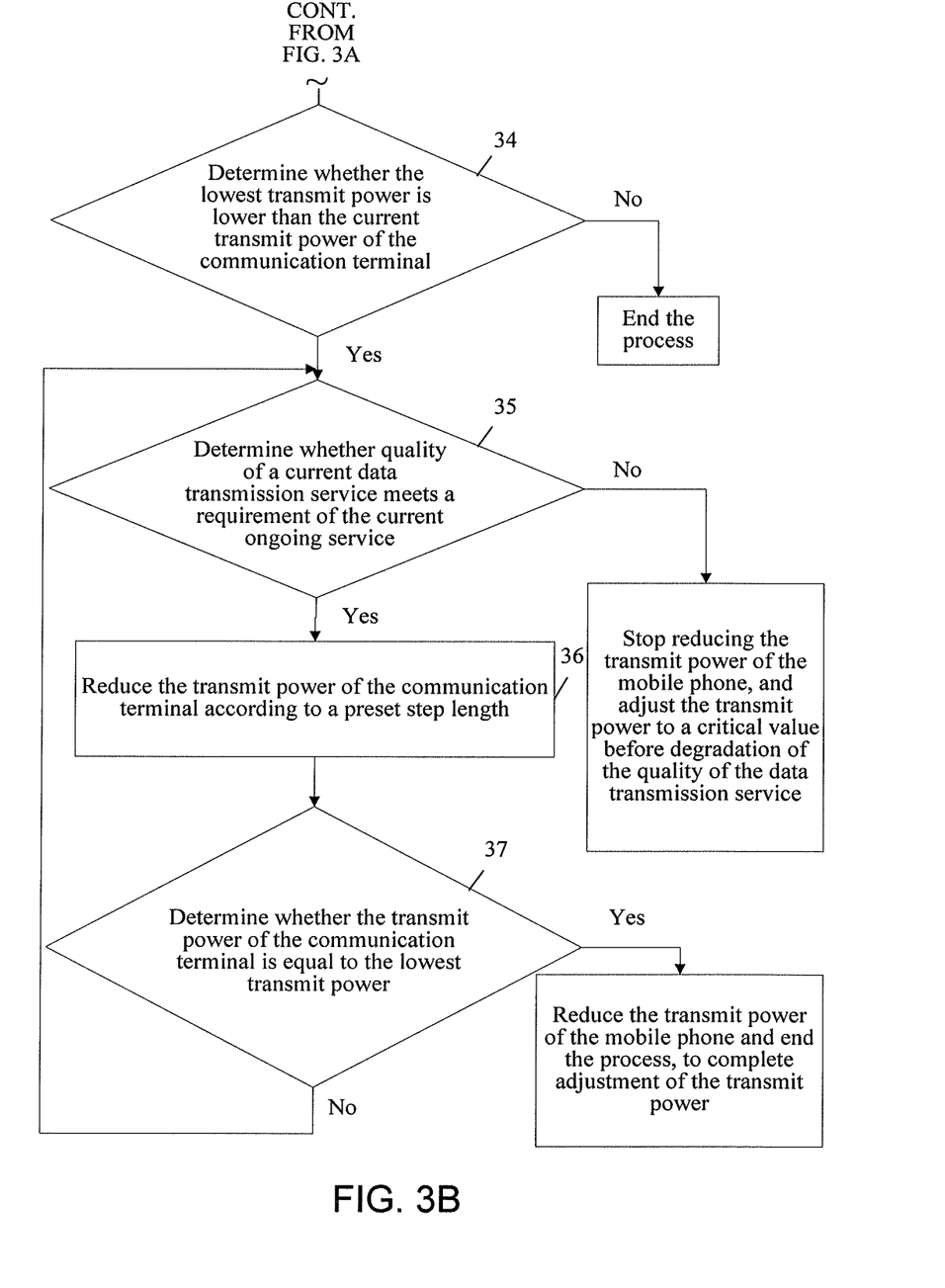

As shown in FIG. 2 and FIG. 3, the following illustrates the technical solutions provided in an embodiment of the present invention by taking a certain mobile phone that is configured with a method in this embodiment and has a WiFi function. If the initial transmit power of the mobile phone is 17 dBm, the specific implementation process of the solutions can include the following steps:

Step 31: Establish connection with a wireless network access point to acquire actual received signal strength of the communication terminal, a wireless network service type, and a modulation manner.

Specifically, the mobile phone establishes the connection with the wireless network access point by using the 17 dBm rated power. The actual received signal strength of the communication terminal acquired by the mobile phone is −62 dBm. The wireless network service type and modulation manner that are acquired by the mobile phone include a data rate of 6 Mbps, and an OFDM manner in a 2.4 GHz frequency band.

Step 32: Determine a threshold value of received signal strength of the communication terminal according to the wireless network service type and modulation manner.

Specifically, according to the wireless network service type and modulation manner acquired in step 31, that is, the data rate being 6 Mbps and the modulation manner being OFDM in 2.4 GHz frequency band, and according to wireless network device performance information (as shown in FIG. 2) preset in the mobile phone, the threshold value of the received signal strength of the mobile phone can be determined as −82 dBm.

Step 33: Determine the lowest transmit power of the communication terminal according to the current transmit power of the communication terminal, the actual received signal strength of the communication terminal, and the threshold value of the received signal strength of the communication terminal.

Specifically, according to the current transmit power (that is, 17 dBm) of the mobile phone and the threshold value (that is, −82 dBm) of the received signal strength of the mobile phone, a corresponding constant (that is, 17−82=−65) can be obtained. Then, by adding the constant (that is, −65) to the actual received signal strength (that is, −62 dBm) of the mobile phone, the lowest transmit power (that is, 62−65=−3 dBm) of the mobile phone can be obtained.

Step 34: Determine whether the lowest transmit power is lower than the current transmit power of the communication terminal; if yes, execute step 35; otherwise, end the process.

Specifically, according to the lowest transmit power being −3 dBm acquired in step 33, and the current transmit power being 17 dBm of the mobile phone, it can be determined that the lowest transmit power (that is, −3 dBm) is lower than the current transmit power (that is, 17 dBm) of the mobile phone. Then, execute step 35.

Step 35: Determine whether the quality of a current data transmission service meets a requirement of the current ongoing service; if yes, execute step 36; otherwise, stop reducing the transmit power of the mobile phone, and adjust the transmit power to a critical value before degradation of the quality of the data transmission service.

Specifically, during first execution, the quality of the current data transmission service meets the requirement of the current ongoing service, and execute step 36; during second execution, the quality of the current data transmission service meets the requirement of the current ongoing service, and execute step 36; during third execution, the quality of the current data transmission service meets the requirement of the current ongoing service, and execute step 36; the rest can be deduced by analogy; until the transmit power of the mobile phone is reduced to be −2.5 dBm, the quality of the current data transmission service does not meet the requirement of the current ongoing service, the reducing the transmit power of the mobile phone is stopped, and the transmit power is adjusted to a critical value (that is, −2 dBm) that is before the quality of the data transmission service is degraded, to complete adjustment of the transmit power of the mobile phone.

Step 36: Reduce the transmit power of the communication terminal according to the preset step length.

Specifically, during the first execution, the transmit power of the mobile phone is reduced according to the preset step length (that is, 0.5 dB), and the current transmit power of the mobile phone is 16.5 dBm; during the second execution, the transmit power of the mobile phone is reduced according to the preset step length (that is, 0.5 dB), and the current transmit power of the mobile phone is 16 dBm; during the third execution, the transmit power of the mobile phone is reduced according to the preset step length (that is, 0.5 dB), and the current transmit power of the mobile phone is 15.5 dBm; the rest can be deduced by analogy.

Step 37: Determine whether the transmit power of the communication terminal is equal to the lowest transmit power; if yes, stop reducing the transmit power of the mobile phone and end the process, to complete adjustment of the transmit power; otherwise, execute step 35.

Specifically, during the first execution, the transmit power of the communication terminal is 16.5 dBm, the lowest transmit power is −3 dBm, it can be determined that the transmit power of the communication terminal is not equal to the lowest transmit power, and step 35 is executed; during the second execution, the transmit power of the communication terminal is 16 dBm, the lowest transmit power is −3 dBm, it can be determined that the transmit power of the communication terminal is not equal to the lowest transmit power, and step 35 is executed; during the third execution, the transmit power of the communication terminal is 15.5 dBm, the lowest transmit power is −3 dBm, it can be determined that the transmit power of the communication terminal is not equal to the lowest transmit power, and step 35 is executed; the rest can be deduced by analogy.

With implementation of the embodiments of the present invention, the communication terminal can automatically adjust the transmit power of the communication terminal without affecting normal service applications, and without the need of modifying the wireless network access point, and network disconnection may not occur during the adjustment process. It can be seen that, according to the embodiments of the present invention, not only power consumption can be saved and the standby duration of the mobile phone can be extended, but also radiation to human body can be reduced.

Those skilled in the art can understand that all or part of the steps in the method embodiments can be completed by a program instructing relevant hardware. The program can be stored in a storage medium that can be read by a computer. During execution, the program executes the steps of the preceding method. The storage medium includes all types of media, such as ROM, RAM, magnetic disk, and compact disk, which can store program codes.

Figure 4:
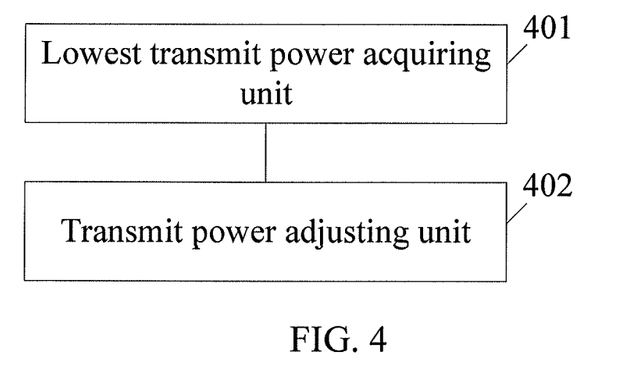
FIG. 4 is a first structural schematic diagram of an apparatus for wireless network connection provided in an embodiment of the present invention.
Figure 5:
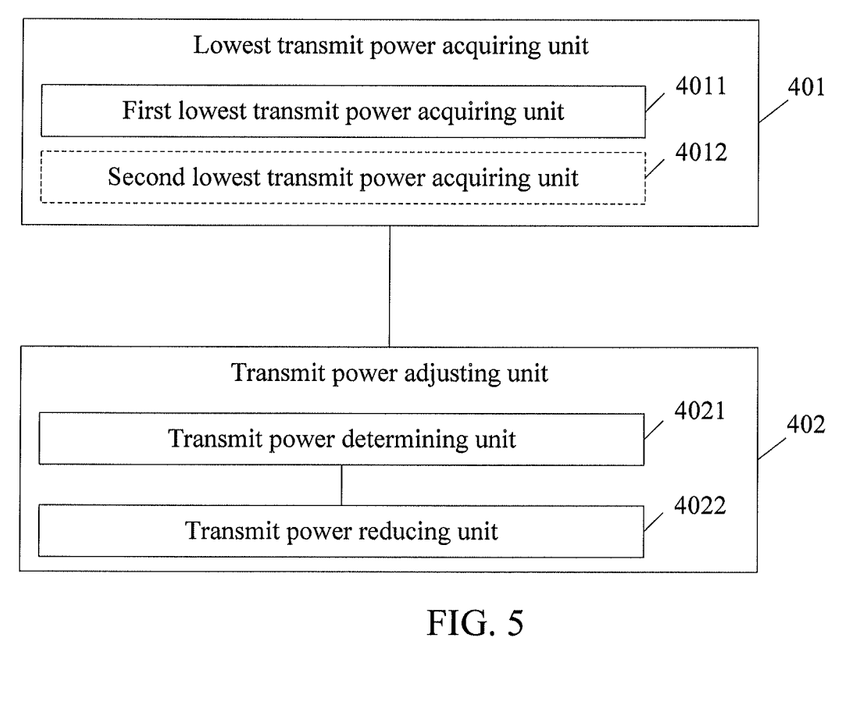
FIG. 5 is a second structural schematic diagram of an apparatus for wireless network connection provided in an embodiment of the present invention.

An embodiment of the present invention further provides an apparatus for wireless network connection. FIG. 4 shows its specific implementation structure. The apparatus can specifically include:

a lowest transmit power acquiring unit 401, configured to acquire lowest transmit power of a communication terminal that establishes connection with a wireless network access point, where the lowest transmit power is minimum transmit power that can ensure connection and communication between the communication terminal and the wireless network access point;

Specifically, as shown in FIG. 5, the lowest transmit power acquiring unit 401 provided in this embodiment of the present invention can include:

(1) a first lowest transmit power acquiring unit 4011, configured to: after the connection with the wireless network access point is established, acquire actual received signal strength, a wireless network service type, and a modulation manner of the communication terminal, determine a threshold value of received signal strength of the communication terminal according to the wireless network service type and modulation manner, and determine the lowest transmit power of the communication terminal according to the current transmit power of the communication terminal, the actual received signal strength of the communication terminal, and the threshold value of the received signal strength of the communication terminal;

for example, the corresponding first lowest transmit power acquiring unit 4011 can be configured to obtain a constant according to the current transmit power of the communication terminal and the determined threshold value of the received signal strength of the communication terminal, and obtain the lowest transmit power of the communication terminal by adding the constant to the acquired actual received signal strength of the communication terminal;

(2) alternatively, a second lowest transmit power acquiring unit 4012, configured to: after the connection with the wireless network access point is established, acquire a wireless network service type and a modulation manner, determine a threshold value of received signal strength of the wireless network access point according to the wireless network service type and modulation manner, and determine the lowest transmit power of the communication terminal according to the current transmit power of the communication terminal, an air interface path transmission loss value, and the threshold value of the received signal strength of the wireless network access point;

For example, the corresponding second lowest transmit power acquiring unit 4012 can be configured to obtain the current received signal strength of the wireless network access point according to the current transmit power of the communication terminal and the air interface path transmission loss value, obtain a difference between the current received signal strength of the corresponding wireless network access point and the determined threshold value of the received signal strength of the wireless network access point, and obtain the lowest transmit power of the communication terminal by subtracting the difference from the current transmit power of the communication terminal.

Figure 6:
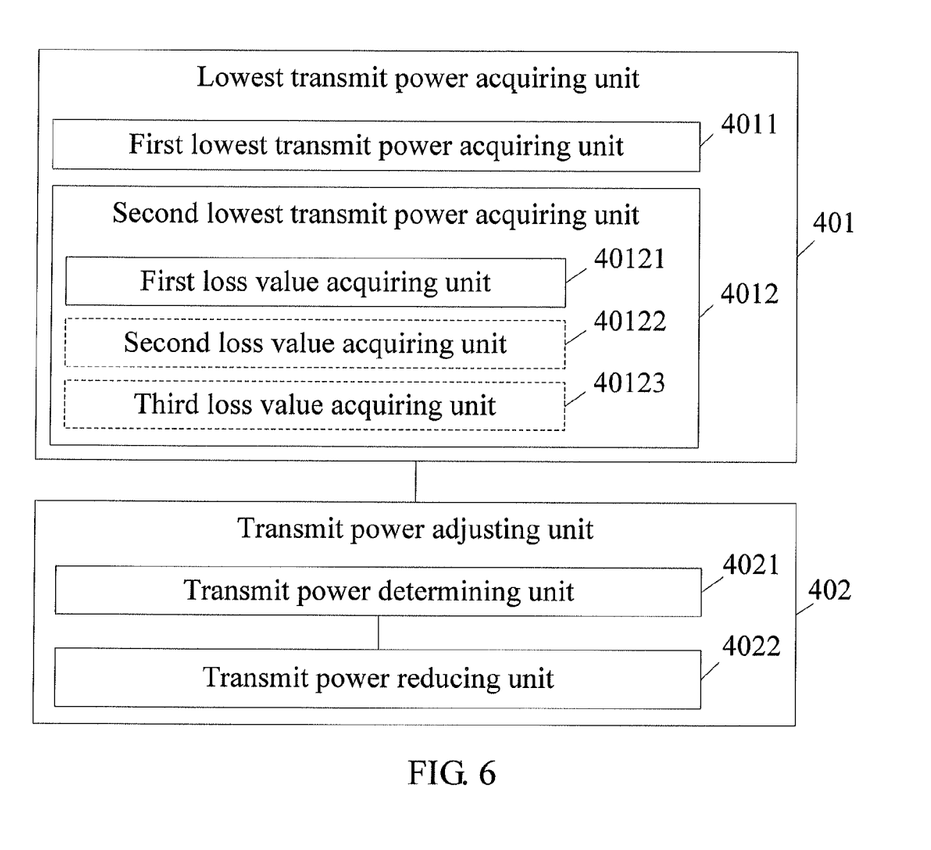
FIG. 6 is a third structural schematic diagram of an apparatus for wireless network connection provided in an embodiment of the present invention.

Further, also as shown in FIG. 6, the second lowest transmit power acquiring unit 4012 provided in this embodiment of the present invention can specifically include:

(1) a first loss value acquiring unit 40121, configured to acquire the air interface path transmission loss value through a real-time measurement manner;

(2) alternatively, a second loss value acquiring unit 40122, configured to acquire a preset air interface path transmission loss value;

(3) alternatively, a third loss value acquiring unit 40123, configured to acquire communication environment information between the wireless network access point and the communication terminal, and determine the corresponding air interface path transmission loss value according to the communication environment information and preset air interface path transmission loss information corresponding to different communication environment information; and a transmit power adjusting unit 402, configured to adjust and determine the transmit power of the communication terminal according to the lowest transmit power acquired by the lowest transmit power acquiring unit 401;

Specifically, also as shown in FIG. 5, the transmit power adjusting unit 402 provided in the embodiment of the present invention can include:

(1) a transmit power determining unit 4021, configured to compare the lowest transmit power acquired by the lowest transmit power acquiring unit 401 with the current transmit power of the communication terminal;

for example, the corresponding transmit power determining unit 4021 can be configured to compare the lowest transmit power acquired by the lowest transmit power acquiring unit 401 with the current transmit power of the communication terminal; if the lowest transmit power is not lower than the current transmit power of the communication terminal, end the process without the need of adjusting the transmit power of the communication terminal; otherwise, a transmit power reducing unit 4022 adjusts the current transmit power of the communication terminal; and (2) the transmit power reducing unit 4022, configured to: when a determination result of the transmit power determining unit 4021 is that the lowest transmit power is lower than the current transmit power of the communication terminal, reduce the transmit power of the communication terminal according to a preset step length until the transmit power of the communication terminal is equal to the lowest transmit power acquired by lowest transmit power acquiring unit 401 or quality of a current data transmission service meets a preset requirement.

An embodiment of the present invention further provides a communication terminal, and the apparatus for wireless network connection shown in any one of FIG. 4 to FIG. 6 is disposed on the communication terminal.

With the implementation of the apparatus embodiment, the communication terminal can automatically adjust the transmit power for communication without making any modification to the wireless network access point, so that not only power consumption is saved and the standby duration of the mobile phone is extended, but also radiation to human body is reduced, and convenient use by users is achieved.

Those skilled in the art can understand that all or part of the steps in the preceding method in the embodiments can be implemented by a program instructing relevant hardware. The program can be stored in a storage medium that can be read by a computer. When the program is executed, processes in the methods provided in the embodiments can be included. The storage medium can be magnetic disk, compact disk, read-only memory (Read-Only Memory, ROM), or random access memory (Random Access Memory, RAM).

The above descriptions are merely about exemplary embodiments of the present invention. However, the protection scope of the present invention is not limited thereto. Modifications or replacements readily thought of by persons skilled in the prior art within the technical scope disclosed by the present invention should fall within the protection scope of the present invention. Therefore, the protection scope of the present invention is subject to the appended claims.

What is claimed is:

1. A method for wireless network connection, comprising:
    acquiring by a communication terminal, the lowest transmit power of the communication terminal that establishes a connection with a wireless network access point, wherein the lowest transmit power is the minimum transmit power that ensures communication between the communication terminal and the wireless network access point;
    adjusting and determining by the communication terminal, transmit power of the communication terminal according to the acquired lowest transmit power.

2. The method according to claim 1, wherein the acquiring of the lowest transmit power of the communication terminal that establishes the connection with the wireless network access point comprises:
    after the communication terminal establishing the connection with the wireless network access point, the communication terminal performing one of:
        acquiring actual received signal strength, a wireless network service type, and a modulation manner of the communication terminal, determining a threshold value of received signal strength of the communication terminal according to the wireless network service type and modulation manner, and determining the lowest transmit power of the communication terminal according to current transmit power of the communication terminal, the actual received signal strength of the communication terminal, and the threshold value of the received signal strength of the communication terminal; or
        acquiring a wireless network service type and a modulation manner, determining a threshold value of received signal strength of the wireless network access point according to the wireless network service type and modulation manner, and determining the lowest transmit power of the communication terminal according to current transmit power of the communication terminal, an air interface path transmission loss value, and the threshold value of the received signal strength of the wireless network access point.

3. The method according to claim 2, wherein a manner for acquiring the air interface path transmission loss value, comprises the communication terminal performing one of:
    acquiring the air interface path transmission loss value through a real-time measurement manner;
    acquiring a preset air interface path transmission loss value; or
    acquiring communication environment information between the wireless network access point and the communication terminal, and determining a corresponding air interface path transmission loss value according to the communication environment information and preset air interface path transmission loss information corresponding to different communication environment information.

4. The method according to claim 1, wherein the adjusting and determining of the transmit power of the communication terminal according to the lowest transmit power, comprises the communication terminal performing:
    when the lowest transmit power is lower than the current transmit power of the communication terminal, reducing transmit power of the communication terminal according to a preset step length until the transmit power of the communication terminal is equal to the lowest transmit power or quality of a current data transmission service meets a preset requirement.

5. An apparatus comprised in a communication terminal for wireless network connection, comprising:
    a lowest transmit power acquiring unit, configured to acquire the lowest transmit power of the communication terminal that establishes connection with a wireless network access point, wherein the lowest transmit power is the minimum transmit power that ensures connection and communication between the communication terminal and the wireless network access point; and
    a transmit power adjusting unit, configured to adjust and determine transmit power of the communication terminal according to the acquired lowest transmit power.

6. The apparatus according to claim 5, wherein the lowest transmit power acquiring unit comprises one or both of:
    a first lowest transmit power acquiring unit, configured to: after the connection with the wireless network access point is established, acquire actual received signal strength, a wireless network service type, and a modulation manner of the communication terminal, determine a threshold value of received signal strength of the communication terminal according to the wireless network service type and modulation manner, and determine the lowest transmit power of the communication terminal according to current transmit power of the communication terminal, the actual received signal strength of the communication terminal, and the threshold value of the received signal strength of the communication terminal; and
    a second lowest transmit power acquiring unit, configured to: after the connection with the wireless network access point is established, acquire a wireless network service type and a modulation manner, determine a threshold value of received signal strength of the wireless network access point according to the wireless network service type and modulation manner, and determine the lowest transmit power of the communication terminal according to current transmit power of the communication terminal, an air interface path transmission loss value, and the threshold value of the received signal strength of the wireless network access point.

7. The apparatus according to claim 6, wherein the second lowest transmit power acquiring unit comprises at least one of:
    a first loss value acquiring unit, configured to acquire the air interface path transmission loss value through a real-time measurement manner;
    a second loss value acquiring unit, configured to acquire a preset air interface path transmission loss value; and
    a third loss value acquiring unit, configured to acquire communication environment information between the wireless network access point and the communication terminal, and determine a corresponding air interface path transmission loss value according to the communication environment information and preset air interface path transmission loss information corresponding to different communication environment information.

8. The apparatus according to claim 5, wherein the transmit power adjusting unit comprises:
- a transmit power determining unit, configured to compare the lowest transmit power acquired by the lowest transmit power acquiring unit with the current transmit power of the communication terminal; and
- a transmit power reducing unit, configured to: when a determination result of the transmit power determining unit is that the lowest transmit power is lower than the current transmit power of the communication terminal, reduce transmit power of the communication terminal according to a preset step length until the transmit power of the communication terminal is equal to the lowest transmit power acquired by lowest transmit power acquiring unit or quality of a current data transmission service meets a preset requirement.

* * * * *